United States Patent [19]

Normandin

[11] Patent Number: 4,973,125
[45] Date of Patent: Nov. 27, 1990

[54] ALL OPTICAL SELF LIMITER FOR FIBER OPTICS

[75] Inventor: Richard J. F. Normandin, Ottawa, Canada

[73] Assignee: National Research Council of Canada, Ottawa, Canada

[21] Appl. No.: 398,648

[22] Filed: Aug. 25, 1989

[51] Int. Cl.$^5$ .................................................. G02B 6/30
[52] U.S. Cl. ............................... 350/96.17; 350/96.15; 350/96.12
[58] Field of Search ............... 350/96.17, 96.11, 96.12, 350/96.15

[56] References Cited

U.S. PATENT DOCUMENTS

| 4,729,618 | 3/1988 | Yoshida et al. | 350/96.12 X |
| 4,753,505 | 6/1988 | Mikami et al. | 350/96.12 X |
| 4,762,382 | 8/1988 | Husain et al. | 350/96.11 X |
| 4,775,215 | 10/1988 | Teng et al. | 350/96.34 |
| 4,776,661 | 10/1988 | Handa | 350/96.12 X |
| 4,838,634 | 6/1989 | Bennion et al. | 350/96.12 |
| 4,910,737 | 3/1990 | Payne et al. | 350/96.15 X |

FOREIGN PATENT DOCUMENTS 0198111 9/1986 Japan .................................. 350/96.17

OTHER PUBLICATIONS

"End fibre coupling between optical fibers and stripe waveguides" Andonovic et al.
First European Conference on Integrated Optics London, England (1H–15 Sep. 1981).

Primary Examiner—William L. Sikes
Assistant Examiner—Phan T. Heartney
Attorney, Agent, or Firm—Yoshiharu Toyooka

[57] ABSTRACT

All optical self limiters in a geometry suitable for use in a fiber optics context are disclosed. Edge coupled light to a silicon thin layer on a doped silicon substrate lowers the refractive index of the layer and eventually brings it to the waveguide cut off condition. In a further embodiment, by varying the amount of light incident on the nonlinear substrate and the nonlinear channel, a fully adjustable limiting action is obtained.

27 Claims, 4 Drawing Sheets

ALL OPTICAL SELF LIMITER FOR FIBER OPTICS

FIELD OF THE INVENTION

The present invention relates generally to fiber optic waveguide self limiters or fiber optic clamps and, in particular, it is directed to all-optical self limiters which include a channel waveguide and are especially useful in the fiber optic systems.

BACKGROUND OF THE INVENTION

In recent years with the use of highly sensitive avalanche photodetectors and higher transmission bit rates, the need for an ultra-fast optical limiter in general optics and integrated optics in particular, for ultimate use in fiber optic systems, has arisen. Such a limiter is a device that protects photosensitive components from optical damage by having a high linear transmittance at low intensities and low transmittance at high intensities. Semiconductors such as silicon, GaAs, InSb, etc. or slower materials such as liquid crystals are obvious candidates. Semiconductors are very attractive since the light induced changes in refractive index can be subpicosecond, thus giving prompt protection to the optical detectors. In a fiber optic system, such an optical limiter can be used to passively remove the pulse to pulse intensity variations on a fiber channel without resorting to complicated and slow electronics.

There have been some demonstrations in the past of self limiters using various nonlinear materials. Thus, for example, in Optics Letters, Vol. 9, No. 7, pp 291-293 (1984), "Nonlinear optical energy regulation by nonlinear refraction and absorption in silicon" by Boggess et al, is described a silicon picosecond nonlinear energy regulator for 1.06 m wavelength. Valera et al also report self switching and limiting in various nonlinear materials in "Demonstration of nonlinear prism coupling", Applied Physics Letters, Vol. 45, No. 10, pp 1013-1015 (1984).

The optical damage susceptibility of self limiters has also been addressed recently in Optics Letters, Vol. 13, No. 4, pp 315-317 (1988), "Self-protecting semiconductor optical limiters", by Hagan et al.

It is recognized that self limiting in nonlinear waveguide geometries is better suited for potential use with fibers. However, these demonstrations all use bulk optics or prism coupling and thus are not directly applicable to fiber optic systems.

U.S. Pat. No. 4,776,658, Oct. 11, 1988, (Normandin), describes a geometry for use in a fiber optic context which has an enhanced performance by utilizing the intrinsic mode coupling characteristics of optical fibers in order to reduce the required drive energy and perform all the common logic functions. Soref and Lorenzo describe, in their article "All-silicon active and passive guided wave components for 1.3 and 1.6 $\mu$m" Journal of Quantum Electronics, Vol. 22, No. 6, pp 873-879 (1986), multimode waveguiding in silicon waveguides for use in the near infrared. While the article mentions the possibility of optically controlling the waveguiding properties, it concentrates on the linear electro-optical properties of these waveguides.

OBJECTS OF THE INVENTION

It is therefore an object of the present invention to provide all optical self limiters which include a channel waveguide made of an optically nonlinear material.

It is another object of the present invention to provide all optical self limiter which includes a channel waveguide having a channel provided on a substrate, each being made of an optically nonlinear material.

It is still a further object of the present invention to provide all optical self limiter which includes a channel waveguide having a channel provided on a substrate, each being made of the same optically nonlinear material doped with dopants to different levels.

It is yet an object of the present invention to provide all optical self limiters whose cutoff levels are adjustable.

It is a further object of the present invention to provide all optical self limiter whose cutoff level is adjusted by varying the coupling geometry between an input fiber optic and a channel waveguide.

It is also an object of the present invention to provide an all optical limiter in an all waveguide configuration with an adiabatic construction.

SUMMARY OF THE INVENTION

Briefly stated, an optical limiter according to the present invention comprises a channel waveguide which has an input facet at one end and has a substrate and a channel provided on the substrate. The substrate and the channel are made of optically nonlinear materials. The limiter also includes an input fiber optic and an output fiber optic. The input fiber optic is positioned near the facet to optically couple the input fiber optic to the channel waveguide for sending an input light thereinto. The output fiber optic is coupled to the channel waveguide for receiving an output light therefrom. The channel has the refractive index higher than that of the substrate for transmitting through it under a guiding condition the input light which has the wavelength longer than or near the bandgap energy of the channel. Therefore, in the self limiter of the present invention, the input light having the intensity higher than a cutoff level, disturbs the guiding condition to maintain the intensity of the output light at a preset limiting level.

BRIEF DESCRIPTION OF THE DRAWINGS

For a more complete understanding of the present and for further objects and advantages thereof, references may be made to the following description taken in conjunction with the accompanying drawings in which.

DETAILED DESCRIPTION OF PREFERRED EMBODIMENTS

Figure 1:
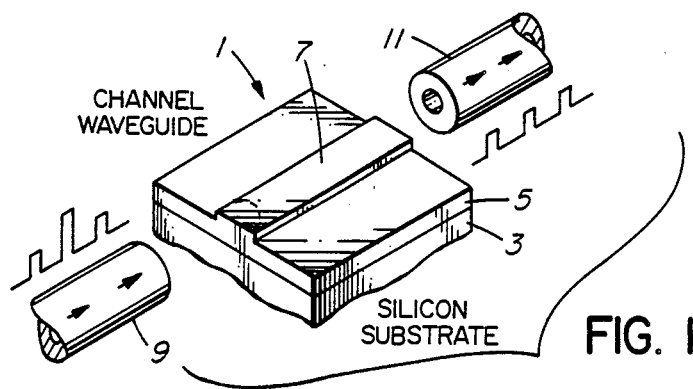
FIG. 1 is a schematic illustration of an all optical self limiter according to one embodiment of the invention.

FIG. 1 shows one of the preferred embodiments of the present invention. A channel waveguide 1 is made of silicon substrate 3 and a channel layer 5, a part of which, in this embodiment, has a thickness larger than the remaining parts and forms a ridged channel 7. It is of course possible to provide a channel on the substrate without a channel layer or to provide a channel layer of a specific thickness to form a planar channel waveguide without ridges. An input fiber optic 9 and an output fiber optic 11 are both single mode fiber carrying, for example, 1.06 $\mu$m wavelength light. Pulses at the input and output fiber optics are shown in the figure schematically beside the fiber optics. In the embodiment, a single mode slab waveguide was first made; an antimony doped silicon wafer (carrier density, n-type, $N_2 = 3 \times 10^{18} cm^{-3}$) was used as substrate on which was provided a standard MBE growth of 6.8 $\mu$m lightly doped (carrier density $N_1 = 10^{15} cm^{-3}$) expitaxial layer for the layer 5. The wafer was then cleaved to obtain sharp 90° facets suitable for edge coupling of the fibers. The channel 7 was formed by etching parts of the layer. The fibers have an 8 $\mu$m core. While a ridge waveguide is shown in the figure, planar geometry is also possible, as discussed above. In fact the following theoretical treatment by numerical modeling takes only the planar geometry into consideration for simplicity.

The guiding of the light is due to the resultant change of the real part of the index of refraction for the layer and the substrate. According to Drude approximation, the resultant change $\delta n$ is expressed by:

$$\delta n = N_3 - N_2 \frac{e^2}{2 \cdot n \cdot \epsilon_o m^* \cdot \omega^2} \tag{1}$$

where, $N_3$ and $N_2$ are the carrier densities in the substrate and layer, respectively, and the other symbols have the usual meanings:

n = index of refraction of a semiconductor, eg Si in this calculation;

e = the electronic charge;

$\omega$ = the angular light frequency;

$\epsilon_o$ = the free space permittivity; and m* = the effective mass of the dopant impurity.

In silicon, As or P are usually the n-type dopants introduced to lower the refractive index and with $N_3 = 10^{18} cm^{-3}$ a change of the order of 0.001 to 0.003 is induced. Layer thicknesses of 5 to 10 $\mu$m are then able to guide the light. A full calculation of the 1.06 $\mu$m waveguiding properties of a silicon guide made of a layer with $10^{15} cm^{-3}$ residual doping and a substrate doped to $3 \times 10^{18}$ at 1.06 $\mu$m at very low intensities is presented in FIG. 2.

At high intensity, guiding of 1.06 $\mu$m light will be quite different. This wavelength is close to the band-gap energy and the resultant creation of electron-hole pairs by interband transitions will affect the refractive index in an appreciable way. Thus the local index will depend on the intensity and integrated energy of the light pulse. Furthermore, the diffusion and recombination of the photogenerated carriers will modify the guide's response to different pulse widths. The induced changes in refractive index by 1.06 $\mu$m light for pulses shorter than diffusion times in silicon can be calculated by:

$$\delta n = \frac{e^2 \cdot \tau \cdot \alpha(T) \cdot \sqrt{\pi}}{4 \cdot n \cdot m_{eh} \cdot \omega^2 \cdot \epsilon_o \cdot h\nu} I_o + \tag{2}$$

$$\frac{\alpha(T) \cdot \sigma(T) \cdot \tau^2 \cdot \pi}{8 \cdot C \cdot h \cdot \nu} \cdot \frac{\partial n}{\partial T} I_o^2$$

where $$\alpha(t) = \left[ \frac{T}{172.3} \right]^{4.25} \cdot cm^{-1} \quad \sigma(T) = 1.7 \times 10^{-20} \cdot T \cdot cm^2$$

and $$\delta n = -8.55 \times 10^{-10} I_o + 4.2 \times 10^{-18} I_o^2 \tag{4}$$

where C is the heat capacity per unit volume, T the temperature, $\sigma_{eh}$ the free carrier absorption cross-section, $I_o$ peak intensity, h Planck's constant, t the gaussian time duration, and $\nu$ the frequency of light. The first term of equation (2) is strictly from the Drude contribution and lowers the index linearly with the intensity (this assumes a gaussian pulse time dependence) whereas the second term describes the thermal contributions to the index change.

The output intensity profile out of the input fiber, as shown in FIG. 1, results in a gaussian perturbation of the refractive index at the coupling edge of the waveguide. The light induced refractive index perturbations are then superposed to the normal waveguide doping induced refractive index and the resultant profile used to compute an effective input numerical aperture. This approach gives similar results the mode overlap method for computing coupling efficiencies between fibers and ridge waveguides as in "Single mode fiber-to-channel waveguide coupling" SPIE Proc. 317, pp 39-46 (1981) by O. Glen Ramer. This is repeated for several distances between the input fiber and the coupling face. Of course, as the light from the fiber diverges, it will overlap further with the substrate and also lower its refractive index. The coupled intensity is then increased in order to cause the guided field to lower the layer's refractive index until cutoff is reached. The calculations were first performed for typical experimental geometries, coupling distances of 15 $\mu$m, 8 $\mu$m core fiber, 6.8 and 12 $\mu$m thick films on a n-type $3 \times 10^{18} cm^{-3}$ doped substrate. For 20 ns long pulses carrier diffusion had very little effect on the calculations and, taking into account the results in FIG. 2, typical limiting energies of 140 to 150 nJ and 450 nJ were found for the 6.8 and the 12 $\mu$m thick samples respectively.

For 100 ns long pulses, carrier diffusion has to be included in the theoretical model in order to relate accurately the time behaviour of the refractive index at each position and near the waveguide interface to the substrate in particular. A simple diffusion model is used:

$$N(x,t) = \frac{\alpha(T)I_o}{\sqrt{4\pi D} \; h\nu} \int_{-\infty}^{t} \int_{-\infty}^{\infty} \frac{1}{\sqrt{t-t'}} \left( \exp\left[-\left(\frac{t'}{\tau}\right)^2\right] \exp\left[-\left(\frac{x'}{R_o}\right)^2\right] \exp\left[\frac{(x-x')^2}{4D(t-t')}\right] \right) dx'dt'$$

where D is the ambipolar diffusion coefficient. Cutoff energies of 180 and 560 nJ are predicted for 6.8 and 12 μm guides. The carriers can diffuse more during the long pulse and reach the substrate and lower its refractive index too. This results in an increase in guided intensity needed to reduce further the guide index to compensate. At the same time heating effects become more important and serve to increase the refractive index. Free carrier absorption also changes energy deposition at each spatial position in a time dependent fashion. The computer modeling shows a complicated interplay between all these effects for this particular material and example.

EXPERIMENTAL RESULTS

Figure 2:
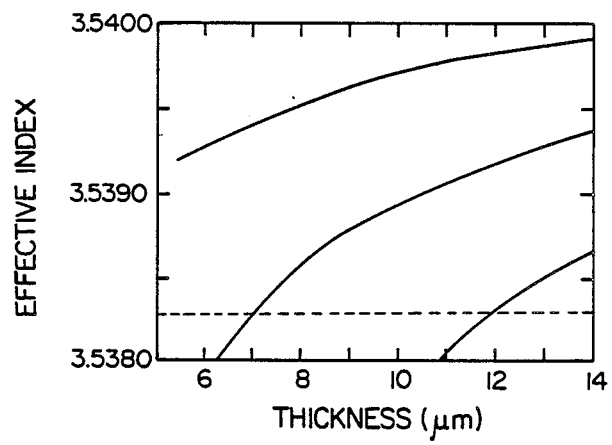
FIG. 2 is a graph showing the guiding condition of a channel waveguide in terms of the effective mode index relative to the channel thickness at wavelength of 1.06 $\mu$m.

MBE grown silicon films in the geometry of FIG. 1 were built with a substrate doping and thicknesses compatible with results presented in FIG. 2 for 6.8 μm and 12 μm thick films. Two other guides were also grown, both below cutoff conditions and therefore leaky. With optimised planar and ridged guides, insertion losses ranged from 5 to 15 dB depending on the quality of the coupling anti-reflection coatings and mode matching to the ridge waveguide modes. Typical ridges are approximately 4 by 10 μm in size. The 1.06 μm light pulses were generated a Nd-YAG laser for both the 20 and 100 ns pulses. Data was taken only for good single longitudinal mode operation of the laser. The beams were then coupled to standard step index 8 μm core fibers of NA=0.12 with commercial single mode couplers in order to insure accurate and repeatable coupling behaviours.

Figure 3:
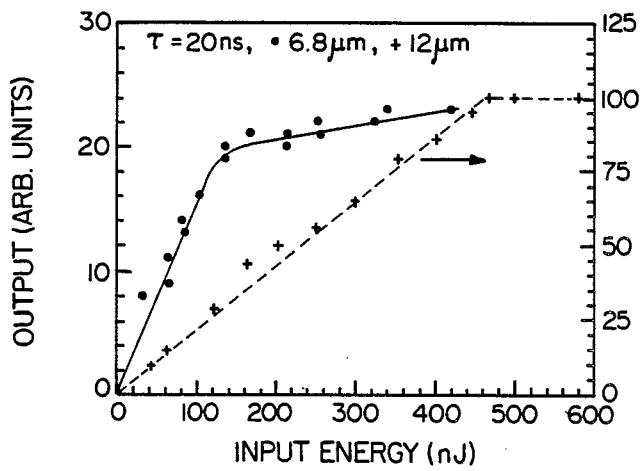
FIG. 3 shows nonlinear transmission and limiting for 20 ns gaussian pulses for the 6.8 $\mu$m thick guide and the 12 $\mu$m thick guide.
Figure 4:
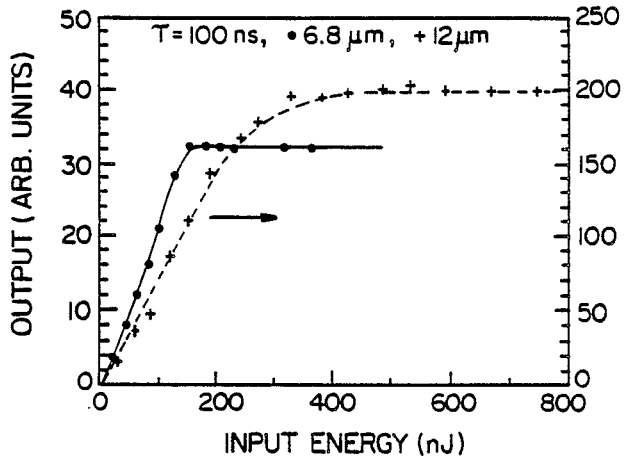
FIG. 4 shows nonlinear transmission and limiting for 100 ns gaussian pulses for the 6.8 $\mu$m thick guide and the 12 $\mu$m thick guide.

The wafers were cleaved to obtain sharp, nearly perfect 90° facets suitable for edge coupling of fiber light. Initial setup was then performed by imaging the output face with a microscope lens onto an infrared sensitive camera. The output fiber was then installed as presented in FIG. 1. As predicted, as the input light intensity was raised, output limiting was observed due to mode cutoff in the guide and numerical aperture modulation at the coupling edge. In both cases, for 20 ns light pulses, the onset of saturation was in good agreement with my theoretical predictions. This is shown in FIG. 3. For longer pulses, e.g. 100 ns, diffusion is incorporated to the theory as previously described and the saturation behaviour is again found to be in good agreement with the results of the previous section, although not quite as good as the 20 ns results. Obviously, the carrier diffusion at the coupling edge cannot be modelled by a simple one or two dimensional theory. The results are shown in FIG. 4.

In all cases the fiber to waveguide distance was maintained to 15 μm as accurately as possible to get close agreement with the theoretically calculated cases, since, as is the case for this patent application, the peak power guided or in limiting is strongly dependent on this fiber to guide distance.

Figure 5:
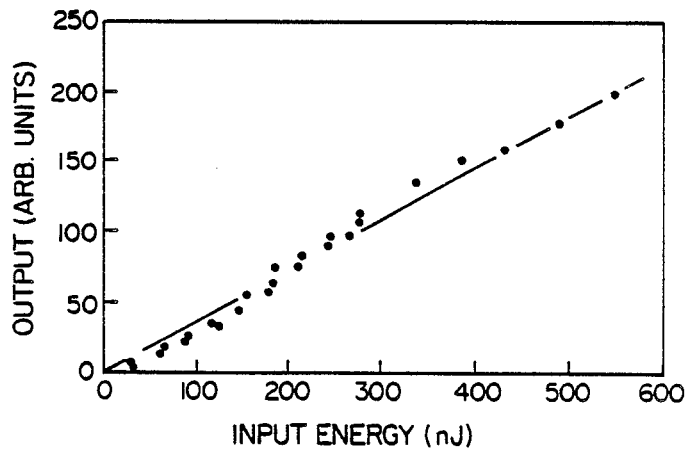
FIG. 5 shows transmission for two waveguides which do not satisfy the specific guiding condition, one slightly too thin, the other with too low substrate doping. Both exhibit linear transmission.
Figure 6A:
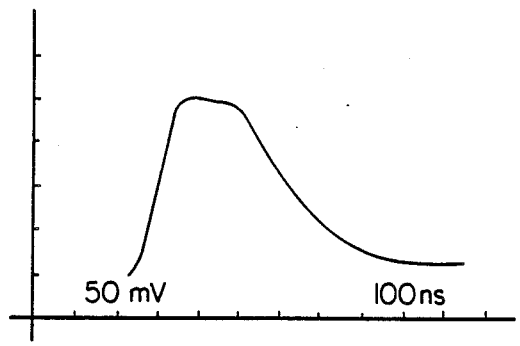
FIGS. 6a and 6b illustrate typical transmitted pulse shapes for "normal" limiting action and at higher intensities when thermal and diffusion effects are important.
Figure 6B:
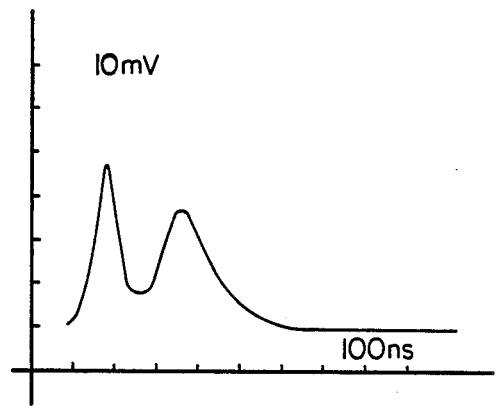

Although free carrier absorption will contribute here to the observed limiting action, the overall integrated energy is too low, in this geometry, to affect significantly the results. This is shown in FIG. 5 with two different waveguides below the cutoff condition. Little light is transmitted. The throughput, with similar energies as used in the previous cases, is quite linear without signs of limiting due to nonlinear free carrier absorption. For longer pulses at high fluences, thermal effect were observed as shown in FIGS. 6a and 6b. Recall that thermal effect will raise the refractive index (eq. 4). The combination of thermal effects and diffusion leads to oscillatory throughput and up to four oscillations have been observed as the various nonlinear effects interact.

Figure 7A:
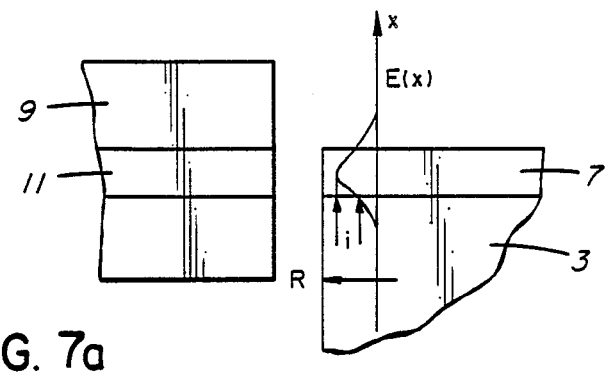
FIGS. 7a and 7b are schematic representations of fiber-to-waveguide coupling at short distances and at large distances, respectively, according to another embodiment of the invention.
Figure 7B:
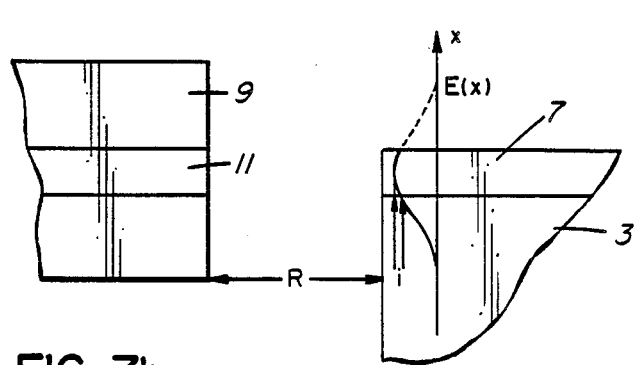

FIGS. 7a and 7b depict another embodiment of the invention in schematic cross section. In the figures, like numerals are used for like parts shown in FIG. 1. The core of the input fiber optic is designated by 11. Also shown in the figures are gaussian distributions of light and R indicating an adjustable distance between the input fiber optic and the waveguide.

As mentioned above, the single mode fiber has a numerical aperture of 0.12 setting a limit on the light divergence out of the fiber edge. Therefore, when the fiber is quite close to the waveguide, as shown in FIG. 8a, the difference between the peak intensity at the centre of the waveguide and at the interface to the substrate is quite large. Because both the substrate and the guide are made of silicon and nonlinear by the same amounts, there is a large difference in the light induced decrease in index of refraction between the centre of the guide and its interface. This results in an easy condition to reach cutoff. Consider, however, the situation depicted in FIG. 7b where the fiber to guide distance is much larger. The angular spread of the light will be such as to lessen the difference between the intensity at the centre versus the intensity at the interface. In both figures this difference indicates that the value of the index of refraction at the interface and in the substrate is also reduced along the value in the waveguide centre. Since there is little difference in index of refraction to cancel the substrate doping induced difference of index giving rise to guiding, a higher peak intensity will be required to reach cutoff for the waveguide system.

Figure 8:
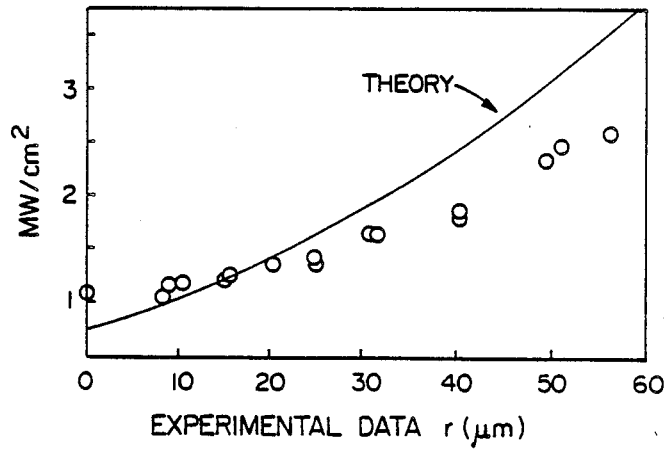
FIG. 8 is a graph showing the calculated and experimental measurements of peak light intensity transmitted as a function of fiber to waveguide distance for a 6.8 $\mu$m guide.

The results of a coupling calculation and experimental measurements are presented in FIG. 8 for the 6.8 μm silicon waveguide. First the angular distribution of the 1.06 μm light on the input face is computed from the fiber numerical aperture. The resultant change in index of refraction is then evaluated at each spatial position in the waveguide and the substrate. This index change is then superposed to the permanent index change in the substrate due to its n-type doping of $N_3 = 3 \times 10^{18} \text{cm}^{-3}$. The resultant index profile is then used to compute the guided mode properties and its coupling of the incident light. This is shown by the solid line. This procedure was repeated for increasing values of light intensities until cutoff was reached for several given fiber-to-wave-guide distances. As shown in FIG. 8 the limit point for such a system is dependent on this fiber-to-waveguide distance. We therefore have a fast subpicosecond limiter which is adjustable by simply varying to fiber position in front of the waveguide. The distances involved are easily controlled by piezoelectric elements and the mechanical stability required in positioning is achieved with V grooves etched in silicon, a standard technique.

Figure 9A:
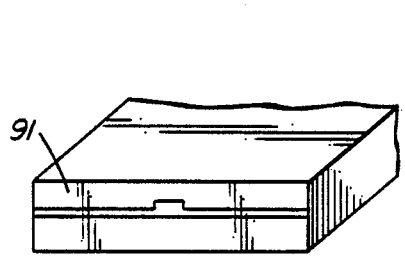
FIGS. 9a, 9b, 10 and 11 are schematic illustrations of the present invention according to further embodiments.
Figure 9B:
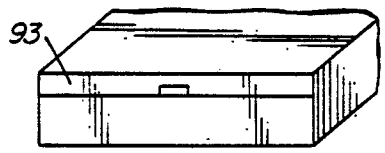

It is worth noting that several modifications are possible which enhance some of the desired characteristics of the optical limiter. For an increased sensitivity to the guided intensity, a superstrate, also of nonlinear material, can replace the top air interface, as illustrated in FIGS. 9a and 9b. This third nonlinear material 91 or 93 can be identical to the substrate and yields relaxed cutoff conditions. The third nonlinear material can also be made of a different material with compensating positive or negative Kerr constant (i.e. an increase in light intensity will increase or decrease the refractive index) for an alternate mode of operation.

In another mode of operation the present inventor investigated and measured the nonlinear coupling behaviour in the case of a translation above and below the film's symmetry plane. As predicted, the coupling ratio demonstrate a remarkable insensitivity to the fiber transverse position up and down. This would be quite useful for harsh and vibration prone environments.

Figure 10:
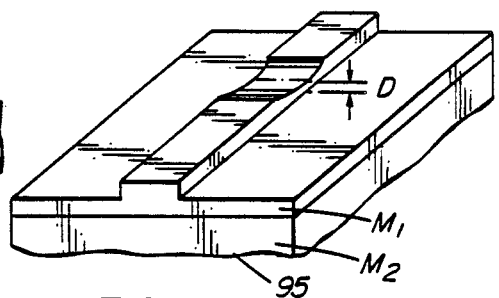
Figure 11:
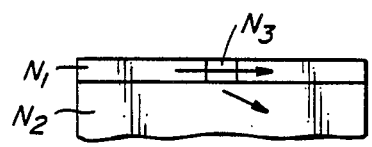

As a further embodiment of the present invention, FIG. 10 depicts the design of an adiabatic nonlinear limiter. The cross section of the film 95 is tapered to the desired point with a thickness D such that for a given guided light intensity, the near cutoff region is brought to cutoff and thus is limiting. For ridged waveguides either or both the width and thickness can be varied. The final intensity at which the limiting occurs can be adjusted by final laser trimming of "D" under actual operation in a method similar to that used to adjust precision resistors in the electronics industry. A similar effect can also be obtained by introducing an increased doping $N_3$ into a section of the channel as shown in FIG. 11. This increased doping will reduce the refractive index of that particular section and therefore bring it closer to the cutoff condition. The guided light will then induce limiting by further reducing the refractive index and cause this section of the guide to reach cutoff at the predetermined intensity. In effect this geometry is an extension of the fiber coupler presented above where the input fiber is replaced by the input portion of the optical double nonlinear waveguide. The tapered region is similar in action to the nonlinear coupling region. Many other geometries using the concept of multi-nonlinear film control of the optical waveguide properties are thus possible.

What is claimed is:

1. An optical limiter comprising:
   a channel waveguide having an input facet at one end and having a substrate and a channel provided on the said substrate, the said substrate and the channel being made of optically nonlinear materials,
   an input optical waveguide positioned near the said facet to optically couple the said input optical waveguide to the said channel waveguide for sending an input light thereinto, and
   an output optical waveguide optically coupled to the said channel waveguide for receiving an output light therefrom,
   the said channel having the refractive index higher than that of the said substrate for transmitting therethrough under a guiding condition the said input light having the wavelength longer than or near the bandgap energy of the said channel, in that the said input light having the intensity higher than a cutoff level disturbs the said guiding condition to maintain the intensity of the said output light at a preset limiting level.

2. The optical limiter, according to claim 1, wherein the said substrate and the said channel are made of an optically nonlinear material, each doped with a dopant so that the said channel has the refractive index higher than that of the said substrate.

3. The optical limiter, according to claim 2, wherein the said substrate and the said channel are doped with a dopant to different levels so that the said channels has the refractive index higher than that of the said substrate.

4. The optical limiter, according to claim 3, wherein the said optically nonlinear material is silicon and the said dopant is either phosphorous or arsenic.

5. The optical limiter, according to claim 1, further comprising:
   a superstrate made of an optically nonlinear material, and
   the said superstrate being provided on the said channel to modify the said guiding condition.

6. The optical limiter, according to claim 5, wherein the said substrate, the said superstrate, and the said channel are made of an optically nonlinear material, each doped with a dopant so that the said channel has the refractive index higher than those of the said substrate and the said superstrate.

7. The optical limiter, according to claim 6, wherein the said substrate, the said superstrate and the said channel are doped with a dopant to different levels so that the said channel has the refractive index higher than those of the said substrate and the said superstrate.

8. The optical limiter, according to claim 5, wherein the said superstrate is made of an optically nonlinear material different from those of the said substrate and the said channel.

9. The optical limiter, according to claim 1, wherein the said channel has a tapered section to modify the cutoff level.

10. The optical limiter, according to claim 2, wherein the said channel has a tapered section to modify the cutoff level.

11. The optical limiter, according to claim 3, wherein the said channel has a tapered section to modify the cutoff level.

12. The optical limiter, according to claim 5, wherein the said channel has a tapered section to modify the cutoff level.

13. The optical limiter, according to claim 6, wherein the said channel has a tapered section to modify the cutoff level.

14. The optical limiter, according to claim 7, wherein the said channel has a tapered section to modify the cutoff level.

15. The optical limiter, according to claim 8, wherein the said channel has a tapered section to modify the cutoff level.

16. The optical limiter, according to claim 3, wherein the said channel has a section having a different refractive index from that of the remaining part thereof to modify the cutoff level.

17. The optical limiter, according to claim 5, wherein the said channel has a section having a different refractive index from that of the remaining part thereof to modify the cutoff level.

18. The optical limiter, according to claim 6, wherein the said channel has a section having a different refractive index from that of the remaining part thereof to modify the cutoff level.

19. The optical limiter, according to claim 7, wherein the said channel has a section having a different refractive index from that of the remaining part thereof to modify the cutoff level.

20. The optical limiter, according to claim 1, wherein the said input waveguide is a fiber optic, and the position of the said input fiber optical with respect to the said facet is adjustable in order to vary the coupling of the said fiber optic to the said channel waveguide so that the said cutoff level can be adjusted.

21. The optical limiter, according to claim 1, wherein:
the said input waveguide is a fiber optic,
the said input fiber optic is positioned at a predetermined distance from the said facet, and
the said predetermined distance is adjustable in order to vary the coupling of the said input fiber optic to the said channel waveguide so that the said cutoff level can be adjusted.

22. The optical limiter, according to claim 2, wherein:
the said input waveguide is a fiber optic,
the said input fiber optic is positioned at a predetermined distance from the said facet, and
the said predetermined distance is adjustable in order to vary the coupling of the said input fiber optic to the said channel waveguide so that the said cutoff level can be adjusted.

23. The optical limiter, according to claim 3, wherein:
the said input waveguide is a fiber optic,
the said input fiber is positioned at a predetermined distance from the said facet, and
the said predetermined distance is adjustable in order to vary the coupling of the said input fiber optic to the said channel waveguide so that the said cutoff level can be adjusted.

24. The optical limiter, according to claim 4, wherein:
the said input waveguide is a fiber optic,
the said input fiber optic is positioned at a predetermined distance from the said facet, and
the said predetermined distance is adjustable in order to vary the coupling of the said input fiber optic to the said channel waveguide so that the said cutoff level can be adjusted.

25. The optical limiter, according to claim 5, wherein the said input waveguide is a fiber optic, and the position of the said input fiber optic with respect to the said facet is adjustable in order to vary the coupling of the said input fiber optic to the said channel waveguide so that the said cutoff level can be adjusted.

26. The optical limiter, according to claim 9, wherein the said input waveguide is a fiber optic, and the position of the said input fiber optic with respect to the said facet is adjustable in order to vary the coupling of the said input fiber optic to the said channel waveguide so that the said cutoff level can be adjusted.

27. The optical limiter, according to claim 16, wherein the said input waveguide is a fiber optic, and the position of the said input fiber optic with respect to the said facet is adjustable in order to vary the coupling of the said input fiber optic to the said channel waveguide so that the said cutoff level can be adjusted.

* * * * *